INVENTOR:
Remy Jules Robert
BY
ATTORNEY

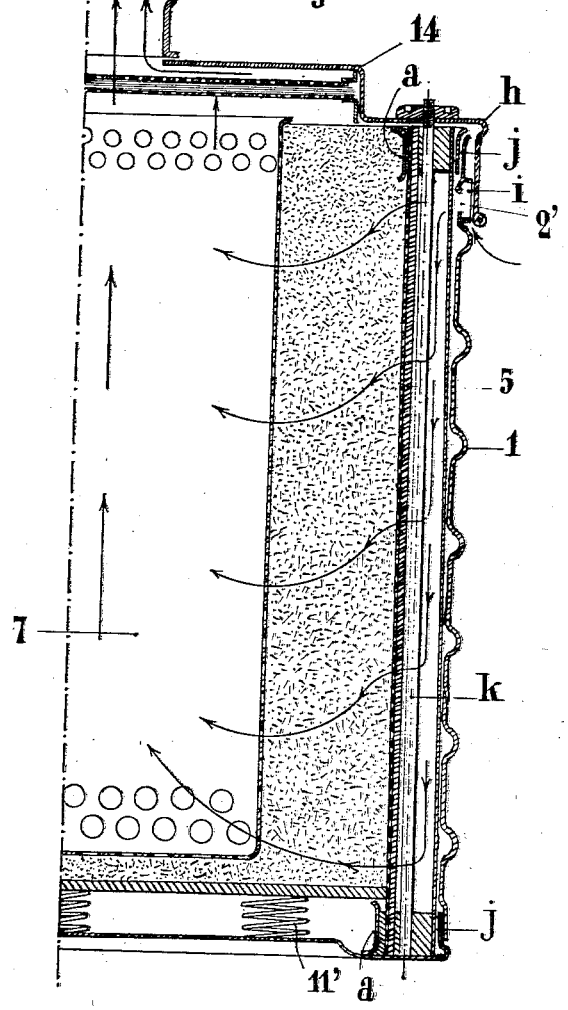
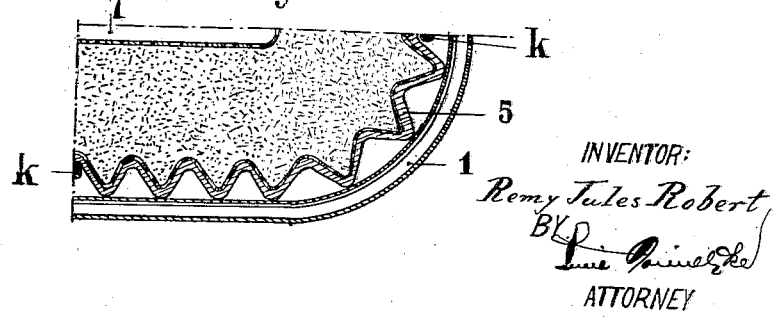

Patented May 18, 1926.

1,585,113

UNITED STATES PATENT OFFICE.

REMY JULES ROBERT, OF VERSAILLES, FRANCE, ASSIGNOR TO LA SOCIÉTÉ D'ETUDES ET DE CONSTRUCTION DE MATÉRIEL DE PROTECTION, SIÈGE SOCIAL, OF PARIS, FRANCE.

RESPIRATOR FOR GAS MASKS.

Application filed March 31, 1924. Serial No. 703,150.

The present invention relates to a new and useful respirator affording protection against deleterious fumes, dust, gases or vapours and of which the following is a specification.

Hitherto the devices used in the industries where workers have to fear deleterious or poisonous fumes, dust and gases or vapours, including microbian dust, have been the devices utilized during the war and especially the A. R. S. gas mask with its cartridge.

This cartridge offers various drawbacks, one of them being the fact that it contains but a small quantity of absorbents; furthermore fumes and dust which can only be stopped by tissue or paper filters readily get through it, and the adaptation of such filters to the said cartridge increases its hindrance to respiration which is already quite marked whenever the cartridge has been in use for some time, while its overhanging position on the mask tires the wearer and may even cause the mask to move away from the forehead, thereby destroying tightness and consequently protection.

Therefore, in order to ensure complete protection in all cases the absorbents must be separate from the mask proper and enclosed in a special can-shaped container.

The cans used with certain French and the foreign appliances either are heavy and cumbersome or involve the following drawback: the device used to stop fumes and dust does not offer a sufficient surface, a feature which may in the long run render breathing very difficult, chiefly when such breathing is made heavier through work or exertion.

The object of my invention is to provide a special can or container for respirators designed to do away with the above mentioned drawbacks due to a system of construction of the filtering surface giving to the latter an area much larger than that of the envelope of the can; furthermore, despite the thinness of the absorbent layer, the absorbents afford an efficient protection due to the fact that, in order to pass through them, air is compelled to follow a sinuous path which increases the duration of its contact therewith and consequently purifies it all the more thoroughly of the poisonous gases which it may carry.

In order to make my invention more readily understood I have illustrated, as examples two practical embodiments thereof in and by drawings appended hereto and therein:

Figures 3 and 4 show a modification of the filtering box. These two views are two fragmental sections one vertical and the other horizontal.

Figure 1:
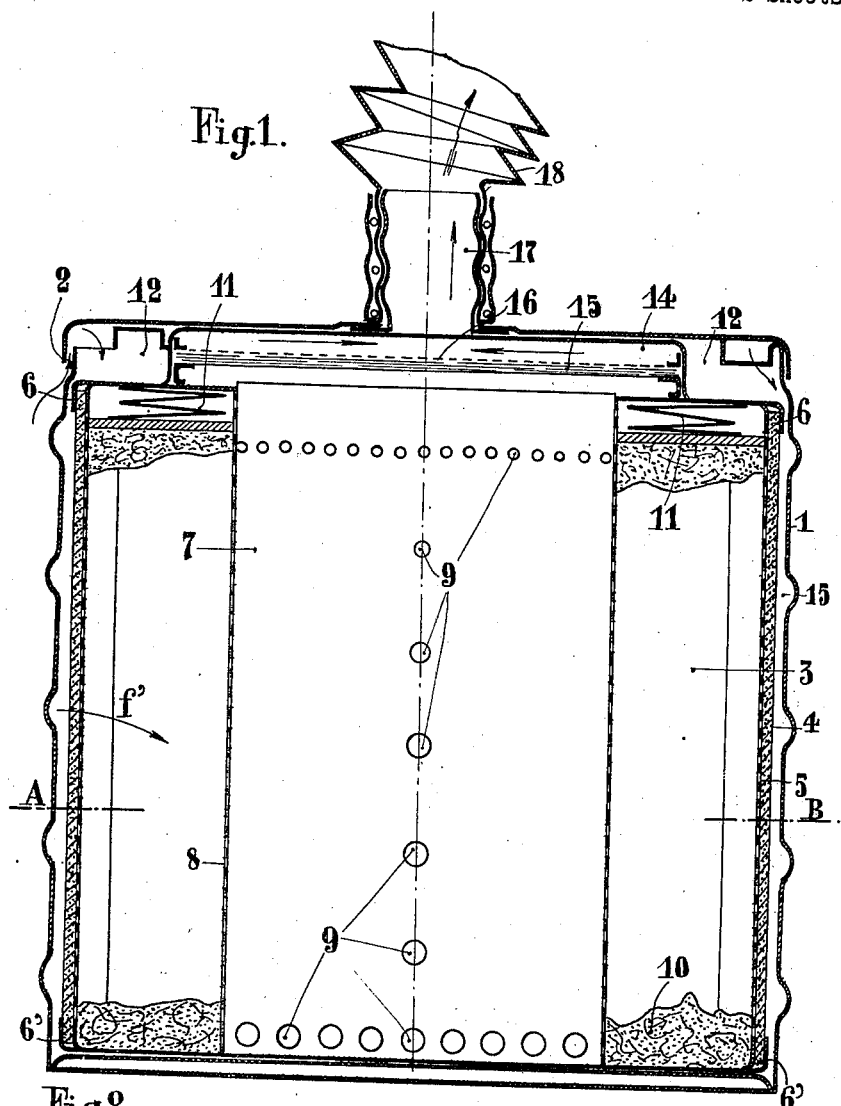
Figure 1 is a central longitudinal section of a device constructed according to the invention.
Figure 2:
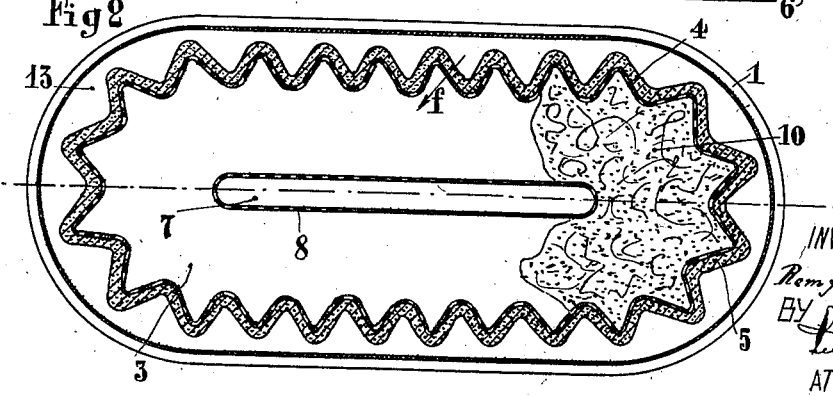
Figure 2 is a cross section of the same, along line A—B of Figure 1.

The container or can illustrated by Figures 1 and 2 comprises a thin undulated, fluted or ribbed sheet metal body 1, provided all the way around its upper edge with notches 2 to afford a passage to intaken exterior air. On the bottom of body 1 is soldered or simply set a second container 3 offering the following peculiarities or characteristics:

Its envelope or shell which is constituted either by sheet metal perforated with numerous holes, or simply by heavy wire gauze, has the form indicated by the dotted line 4 so as to increase its peripheral surface. On this sheet metal or wire gauze shell is applied a second shell or case of fine wire gauze of the same shape; and on the outer face of this second shell, in turn, are applied the filtering tissues 5 which have previously been corrugated to the same form. Said tissues are tightly clamped along their upper and lower edges by the bending down of suitably shaped pieces of sheet metal 6 and 6'; the longitudinal seam is coated with varnish.

Inside and in the centre of this second container is provided a sort of flat strainer 7 soldered vertically on the bottom, made of perforated sheet metal and covered both with wire gauze 8 and with cotton gauze. The holes 9 of the said strainer are only partly shown by Figure 1; the diameter of these holes increases progressively from top downwards so as to provide for the gases traveling in a sinuous path as will be hereinafter explained. The absorbents (activated charcoal and granulated basic material) are mixed and tamped in the annular space 10 being maintained in tamped condition by means of powerful springs 11, but they may be separated by a perforated longitudinal partition (not shown); they are only partly represented in Figures 1 and 2. When, through inbreathing a depression or partial vacuum is produced in the strainer the foul air from outside, passing through notches 2, penetrates into the air chamber 12 and flows along the corrugated tissues into the space 13 between the covering or wall formed by said tissues and the casing 1. It then tends to move inward and downward through the tissue wall and the mass of absorbent material due to the pull of the suction exerted upon it. This suction progressively increases from top to bottom of the apparatus owing to the increasing diameter of the perforations 9, so that the air thus tends to follow the path of least resistance and also the one where depression is greatest; its direction of movement being indicated by the arrows $f$ and $f'$. Hence, it thus follows a curved path not only in the horizontal but also in the vertical direction; the duration of its contact with the absorbents being increased thereby.

On issuing from the strainer the purified air passes into another air chamber 14 divided into upper and lower portions or compartments by a partition layer of cotton gauze 15 supported by a wire gauze layer 16 and intended to stop the particles of granulated material and of charcoal that, due to shocks, may have been carried into the strainer or rose.

A nozzle 17, soldered to air chamber 14, connects the cam to the mask (which may be an A. R. S. mask but without the cartridge or any other respirator thereof) by means of a corrugated rubber tube 18 and a quick closing union. When this union is not closed, atmospheric air is breathed in direct, and whenever poisonous gases are present, its closing ensures instant protection.

The container or can as well as the mask constituted in this manner are placed in a bag carried on the left hand side. When the device is not in use the absorbents are protected against atmospheric moisture by a resilient rubber band which surrounds the can at a point level with the air inlets and by a rubber plug closing the opening of the union of the rubber tube.

With a can 16 x 14 x 6.5 centimeters, the breathing area exceeds 700 square centimeters; the weight of the absorbents is about 500 grams and the hindrance to breathing is materially less than that experienced with any respirator at present in use.

In the modification illustrated by Figures 3 and 4, there is soldered inside the upper and lower covers or lids a second rim $a$ forming with the normal rim of the cover or lid a sort of gutter or channel all around. On the other hand the plaited or corrugated tissues 5 are simply applied on a wire gauze shell which is also plaited and which is denoted by dotted lines in the said Figures 3 and 4. The perforated and plaited sheet metal shell of Figures 1 and 2 is thus done away with and the whole is arranged previous to mounting in a fluted or ribbed outer envelope or case 1 which maintains the wire gauze spaced.

For loading and mounting, the gutters or channels are partly filled with fusible and resilient putty, into which are driven the edges of the wire gauze and of the tissues, the joint being thus made perfectly tight.

Omission of the perforated and painted sheet metal affords also substantial lightening.

The central strainer 7 no longer passes through the filtering box, it is merely soldered to the top cover or lid. The absorbents compressed by the felt-lined small plate (influenced by springs 11') cover completely the bottom of the strainer, so that no foul air can reach the apertures thereof without having gone through the tissues and the absorbents, even should the soldering of the lower cover on the envelope not be tight.

Moreover the respirator chamber 14' is completely freed from the outer envelope, a feature which again renders the device lighter.

Air enters through circular apertures 2' provided around the envelope or shell 1 and protected against the introduction of foreign matter by a cap $h$ the rim of which extends slightly beyond said apertures and which is kept spaced from the envelope either by ribs or by a corrugated metal band $i$.

In Figure 3 the arrows denote the path followed by intaken air.

The covers or lids of the filtering box are soldered on the outer envelope at $j$; as above stated the soldered joints need not be tight and may be constituted by a few drops of solder distributed around. The mounting can also be effected by means of four metal rods $k$ with heads and nuts, arranged at the ends of the two axis thus rendering the apparatus easy to take to pieces for eventual reloading when exhausted.

I claim as my invention:—

1. In a respirator for gas masks, an outer case provided with air inlets; an inner case spaced from the outer case to form an intermediate air chamber and comprising a vertically-corrugated, perforated shell and a filter of woven fibers disposed against the outer face of said shell and conforming to the corrugated shape thereof so as to provide a filtering surface of increased area; a perforated strainer within and spaced from the inner case and adapted to be connected in an air-tight manner with the inlet tube of the mask, to create a suction action in the strainer when the mask is in use; and absorbent purifying material filling the space between the strainer and the inner case.

2. In a respirator for gas masks, an outer case provided with air inlets; an inner case spaced from the outer case to form an intermediate air chamber and embodying a circumferential wall which is pervious to air; a strainer within and spaced from the inner case and provided with horizontal rows of perforations, the perforations of succeeding rows increasing in diameter from top to bottom of the strainer, said strainer adapted to be connected in an air-tight manner with the inlet tube of the mask, to create a suction action in the strainer when the mask is in use; and absorbent purifying material filling the space between the strainer and the inner case.

3. In a respirator for gas masks, an outer case provided with air inlets; an inner case spaced from the outer case to form an intermediate air chamber and comprising a vertically-corrugated, perforated shell and a filter of woven fibers disposed against the outer face of said shell and conforming to the corrugated shape thereof so as to provide a filtering surface of increased area; a strainer within and spaced from the inner case and provided with horizontal rows of perforations, the perforations of succeeding rows increasing in diameter from top to bottom of the strainer, said strainer adapted to be connected in an air-tight manner with the inlet tube of the mask, to create a suction action in the strainer when the mask is in use; and absorbent purifying material filling the space between the strainer and the inner case.

In testimony whereof I affix my signature.

REMY JULES ROBERT.